US010231065B2

United States Patent
Udesen (10) Patent No.: US 10,231,065 B2
(45) Date of Patent: Mar. 12, 2019

(54) SPECTACLE HEARING DEVICE SYSTEM (71) Applicant: GN HEARING A/S, Ballerup (DK)

(72) Inventor: Jesper Udesen, Maalov (DK)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 13/734,882

(22) Filed: Jan. 4, 2013

(65) Prior Publication Data

US 2014/0185845 A1  Jul. 3, 2014

(30) Foreign Application Priority Data

Dec. 28, 2012 (DK) .................................. 2012 70835
Dec. 28, 2012 (EP) ..................................... 12199756

(51) Int. Cl.
*H04R 25/00* (2006.01)
*G02C 11/06* (2006.01)
*G02C 5/14* (2006.01)

(52) U.S. Cl.
CPC .......... *H04R 25/554* (2013.01); *G02C 5/143* (2013.01); *G02C 11/06* (2013.01); *H04R 25/552* (2013.01); *H04R 2460/03* (2013.01)

(58) Field of Classification Search
CPC .... H04R 25/405; H04R 25/552; H04R 1/406; H04R 2201/403; H04R 25/554; H04M 1/6058; G02C 11/06

(Continued)

(56) References Cited

U.S. PATENT DOCUMENTS

| | | | | | |
|---|---|---|---|---|---|
| 3,125,646 A | * | 3/1964 | Lewis | ................... | G02C 11/06 381/326 |
| 5,159,639 A | * | 10/1992 | Shannon | ................ | G02C 11/06 381/312 |

(Continued)

FOREIGN PATENT DOCUMENTS

| | | |
|---|---|---|
| CN | 1701634 | 11/2005 |
| CN | 101784105 | 7/2010 |

(Continued)

OTHER PUBLICATIONS

Second Technical Examination and Search Report dated Apr. 3, 2014 for related DK Patent Application No. PA 2012 70835, 4 pages.

(Continued)

*Primary Examiner* — Curtis A Kuntz
*Assistant Examiner* — Ryan Robinson
(74) *Attorney, Agent, or Firm* — Vista IP Law Group, LLP (57) ABSTRACT

A spectacle hearing device system includes: a first hearing instrument, the first hearing instrument having a first wireless hearing instrument transceiver and a first acoustic output transducer; a pair of spectacles, the pair of spectacles comprising a first wireless spectacle transceiver, and a first plurality of microphones, the first plurality of microphones forming a first directional microphone array configured for generating a first electrical signal from acoustic signals picked up by the first plurality of microphones; a first processor for processing the first electrical signal according to a hearing loss compensation prescription; and a first amplifier for applying the first electrical signal to the first acoustic output transducer; wherein the first wireless spectacle transceiver is configured for transmitting the first electrical signal wirelessly to the first hearing instrument.

16 Claims, 4 Drawing Sheets

(58) Field of Classification Search
USPC .................................. 381/92, 313, 327, 361
See application file for complete search history.

(56) References Cited

U.S. PATENT DOCUMENTS

| | | | | |
|---|---|---|---|---|
| 5,721,783 | A * | 2/1998 | Anderson | H04B 1/385 |
| | | | | 381/312 |
| 6,010,216 | A | 1/2000 | Jesiek | |
| 6,148,087 | A * | 11/2000 | Martin | G02C 5/143 |
| | | | | 381/23.1 |
| 7,529,565 | B2 | 5/2009 | Hilpisch et al. | 455/569.1 |
| 7,609,842 | B2 * | 10/2009 | Sipkema | G02C 11/06 |
| | | | | 381/313 |
| 7,735,996 | B2 * | 6/2010 | van der Zwan | G02C 11/06 |
| | | | | 351/123 |
| 8,081,787 | B2 * | 12/2011 | Haenggi | H04R 25/554 |
| | | | | 381/312 |
| 8,169,938 | B2 * | 5/2012 | Duchscher | H04L 1/0057 |
| | | | | 370/310 |
| 8,189,832 | B2 * | 5/2012 | Boguslavskij | H04W 52/24 |
| | | | | 381/312 |
| 8,442,248 | B2 * | 5/2013 | Solum | H04R 25/554 |
| | | | | 381/315 |
| 8,543,061 | B2 * | 9/2013 | Suhami | H04M 1/7253 |
| | | | | 455/41.3 |
| 8,585,448 | B2 * | 11/2013 | Timsit | 439/882 |
| 8,588,448 | B1 * | 11/2013 | Rickards | G02C 11/10 |
| | | | | 381/322 |
| 9,137,613 | B2 * | 9/2015 | El-Hoiydi | H04B 7/0667 |
| 2002/0197961 | A1 | 12/2002 | Warren | |
| 2004/0029582 | A1 | 2/2004 | Swab et al. | |
| 2005/0100182 | A1 * | 5/2005 | Sykes | G09B 21/009 |
| | | | | 381/315 |
| 2006/0003803 | A1 | 1/2006 | Thomas et al. | |
| 2007/0098192 | A1 | 5/2007 | Sipkema | |
| 2010/0061579 | A1 | 3/2010 | Rickards et al. | |
| 2013/0215374 | A1 * | 8/2013 | Blum | G02C 11/06 |
| | | | | 351/158 |
| 2013/0223250 | A1 * | 8/2013 | Matsuo | H04W 74/0808 |
| | | | | 370/252 |

FOREIGN PATENT DOCUMENTS

| | | | |
|---|---|---|---|
| DE | 76 15 686 U1 | 9/1976 | |
| DE | 10 2008 031581 A1 | 1/2010 | |
| DE | 102008031581 A1 * | 1/2010 | G02C 11/06 |
| DE | 102008031581 B4 * | 3/2013 | H04R 25/00 |
| EP | 1017252 A2 * | 7/2000 | H04R 25/407 |
| EP | 2 211 579 A1 | 7/2010 | |
| JP | 2007108254 | 4/2007 | |
| JP | 2012244317 | 12/2012 | |
| WO | 2004/028203 A2 | 4/2004 | |
| WO | WO 20004-110099 A2 | 12/2004 | |
| WO | WO 20004-110099 A3 | 12/2004 | |

OTHER PUBLICATIONS

European Communication pursuant to Article 94(3) EPC dated Dec. 20, 2016, for corresponding EP Patent Application No. 13 817 699.5, 6 pages.
Chinese First Office Action dated Oct. 27, 2016, for corresponding CN Patent Application No. 201380068784.5.
Japanese First Office Action dated Oct. 20, 2017, for corresponding JP Patent Application No. 2015550112.
Extended European Search Report dated Apr. 25, 2013 for EP Patent Application No. 12199756.3, 9 pages.
First Technical Examination and Search Report dated Aug. 5, 2013 for related DK Patent Application No. PA 2012 70835, 4 pages.

* cited by examiner

PRIOR ART

SPECTACLE HEARING DEVICE SYSTEM

RELATED APPLICATION DATA

This application claims priority to and the benefit of Danish Patent Application No. PA 2012 70835, filed on Dec. 28, 2012, pending, and European Patent Application No. EP 12199756.3, filed on Dec. 28, 2012, pending. The entire disclosures of both of the above-identified applications are expressly incorporated by reference herein.

FIELD

The present application relates to spectacle hearing device systems. More specifically, the present application relates to a hearing device system capable of communicating wirelessly with an associated pair of spectacles. The present application also relates to a pair of spectacles, a wireless device for use with a pair of hearing instruments, a method of operating a spectacle hearing device system and a method of transmitting data wirelessly between a pair of hearing instruments.

BACKGROUND

In the context of this application, a hearing instrument is to be understood as a tiny, electronic device configured for being placed behind or in an ear of a person having an identified hearing loss, i.e. a person having difficulty perceiving certain sounds in his or her environment. The extent and character of the hearing loss is routinely determined by a professional audiologist, or hearing instrument fitter, by recording a sensory audiogram of the person's hearing ability at a range of different frequencies and subsequently selecting and programming a hearing instrument in such a way that the hearing loss of the person is compensated or alleviated, e.g. by amplifying certain frequency ranges in the hearing instrument where the person has difficulty perceiving sounds. In this context, the recorded audiogram and corresponding compensation programmed into the hearing instrument is denoted a hearing loss correction prescription.

Spectacles are also usually fitted by professional optometrists in order to correct vision deficiencies such as astigmatism and other accommodation problems. Apart from spectacles, corrective means may also include contact lenses and recently photorefractive keratectomy, or laser eye surgery. Since both vision problems and hearing deficiencies have a strong tendency to develop with age, and the life expectancy of the population is increasing, many elderly people in modern society suffer from identified problems with both hearing and seeing, and may therefore need to use both a pair of prescription spectacles and one or two hearing instruments simultaneously.

Behind-the-ear (BTE) hearing instruments are notoriously difficult to use with a pair of spectacles due to the fact that the spectacle side bars of the pair of spectacles get entangled with the hearing instruments during use. Therefore, hearing instruments of the in-the-ear (ITE) or the in-the-canal (ITC) type are preferably used together with a pair of spectacles instead of BTE hearing instruments. However, ITE hearing instruments have inferior sound directionality in comparison with BTE hearing instruments due to space constraints in the ITE hearing instrument, limiting the effect of directional microphones in ITE hearing instruments. Directionality, i.e. the capability of enhancing sounds from a particular direction, in hearing instruments is usually obtained by utilizing two or more microphones in a directional microphone array which, together with suitable filtering, favors acoustic signals from a particular direction, usually the direction the hearing instrument user is facing at any given time. ITE hearing instruments having directional microphones do exist, but the short distance between the microphones in a directional microphone pair in an ITE hearing instrument severely limits the hearing instruments' ability to discriminate sounds originating from other directions than the front direction in favor of sound from the frontal direction. As a consequence, hearing instrument users wearing spectacles are therefore unable to benefit fully from the improved directionality offered by BTE hearing instruments.

Wireless, external microphones for use with hearing instruments are known. Various types of external microphones exist, including hand-held, table-top and clip-on types. It would be beneficial to use such a wireless microphone in conjunction with a pair of spectacles. However, an unobtrusive way of positioning one or more wireless microphones on or in a pair of spectacles does not yet exist.

Contemporary hearing instruments comprise wireless transceivers for communicating bidirectionally with e.g. external microphones, remote controllers, personal sound systems or other hearing instruments. A preferred transceiver system exploits the 2.4 GHz frequency band for wireless communication with the hearing instruments. The wireless communication may comprise remote control commands, digital audio streams, prescription fitting telegrams, service readouts, signal processing coordination parameters and synchronization impulses.

In the context of this application, a transceiver is to be understood as an electronic device capable of transmitting and receiving radio signals. Such a radio device may be embodied as an off-the-shelf unit or as part of the integrated circuit providing the functionality of the hearing instrument, i.e. amplification, compression, hearing loss compensation etc. A preferred transceiver for use with a hearing instrument may be configured to operate as both a transmitter and a receiver, solely as a transmitter or solely as a receiver, according to the desired purpose of the transceiver. If e.g. a remote microphone unit is used with a hearing instrument, the transceiver in the microphone unit may preferably be configured only to transmit wireless radio signals, and the transceiver in the hearing instrument may be configured only to receive wireless radio signals, even though both the microphone unit transceiver and the hearing instrument transceiver may actually be realized by identical circuits configured differently. Thanks to the small physical size of the transceiver, it may easily fit into a hearing instrument.

Wireless synchronization signals transmitted from one hearing instrument to another have to be powerful enough to be perceived by a hearing instrument on the opposite side of the head of the hearing instrument user due to the fact that the user's head acts as an obstacle to the transmitted signals. The power requirement of the hearing instrument transceiver while transmitting wireless signals to another hearing instrument therefore puts a heavy load on the hearing instrument battery which, for space considerations, has to be physically small in order to fit inside an ITE-type hearing instrument. A need thus exists to facilitate wireless communication between two hearing instruments in a way which is less demanding on the battery.

Spectacle-wearing hearing instrument users are often having trouble using BTE-type hearing instruments due to the fact that the hearing instruments themselves become entangled with the side bars of the pair of spectacles with e.g. the risk of the hearing instrument falling off the pinna of the hearing instrument user as a result. Glasses with built-in hearing instruments, so-called hearing spectacles, have existed for a long time but are of limited use if the hearing instrument user does not need to wear glasses all the time, e.g. if the hearing instrument user only requires glasses for reading. In this case, a hearing instrument user may have to settle for a pair of ITE hearing instruments. However, ITE hearing instruments inherently provide limited directional sound information to the hearing instrument user due to the limited maximal possible distance between the microphones because of the small dimensions of the outer shell of the ITE hearing instrument. The smaller dimensions of an ITE hearing instrument also incurs a restriction to the physical size and power capability of the hearing instrument battery, thus making e.g. wireless communication between a pair of binaural hearing instruments difficult or even impossible. It would therefore be beneficial to provide an ITE-type hearing instrument user wearing glasses regularly with hearing instrument features associated with BTE-type hearing instruments, such as good microphone directivity and wireless exchange of information between hearing instruments. It would be a further advantage if these features were provided without having to make any significant changes to a pair of existing ITE hearing instruments.

SUMMARY

According to some embodiments a spectacle hearing device system is proposed, said system comprising a first hearing instrument and a pair of spectacles, said first hearing instrument having a first wireless hearing instrument transceiver and a first acoustic output transducer, said pair of spectacles comprising a first wireless spectacle transceiver and a first plurality of microphones, said first plurality of microphones forming a first directional microphone array configured for generating a first electrical signal from acoustic signals picked up by the first plurality of microphones, said system having a first processor for processing the first electrical signal according to a hearing loss compensation prescription and a first amplifier for applying the first electrical signal to the first acoustic output transducer, wherein the first wireless spectacle transceiver is capable of transmitting the first electrical signal wirelessly from the pair of spectacles to the first hearing instrument. In this way, improved directionality of a hearing instrument may be obtained due to the fact that proper beam-forming of the audio signals picked up by the directional microphone array disposed in the pair of spectacles may now be carried out.

In one embodiment, said spectacle hearing instrument system comprises a second hearing instrument having a second wireless hearing instrument transceiver and a second acoustic output transducer, said pair of spectacles comprising a second wireless spectacle transceiver, a second battery and a second plurality of microphones, said second plurality of microphones forming a second directional microphone array configured for generating a second electrical signal from acoustic signals picked up by the second plurality of microphones, said system having a second processor for processing the second electrical signal according to a hearing loss compensation prescription and a second amplifier for applying the second electrical signal to the second acoustic output transducer, wherein the second wireless spectacle transceiver is capable of transmitting the second electrical signal wirelessly from the pair of spectacles to the second hearing instrument. In this way, an efficient, binaural, directional spectacle hearing device system may be realized. This embodiment of the spectacle hearing device system provides an improved directionality to both ears of a hearing instrument user, making it easier for the user to locate the spatial origin of sounds in his or her environment.

In another embodiment, each of the first and the second wireless hearing instrument transceivers comprise a wireless signal detector for detecting a wireless signal, a wireless power estimator for estimating the power of the detected, wireless signal, and a wireless power controller for reducing the transmission power of the corresponding wireless hearing instrument transceiver whenever the power of the detected, wireless signal is estimated to be exceeding a predetermined limit. Thus, the power required for the first wireless transceiver of the hearing instrument may be reduced whenever the hearing instruments and the pair of spectacles are worn simultaneously by a user. The relatively short transmission distance between the first wireless transceiver of the hearing instrument and the spectacle wireless transceiver unit results in a relatively high level of the wireless signal being detected by the transceiver in the hearing instrument. The hearing instrument may then be configured to lower its own transmission power accordingly, thereby reducing the power consumed by the hearing instrument. This may preferably be carried out by prolonging the idle time between transmissions from the hearing instrument transceiver, e.g. acknowledge transmissions. Alternatively, the transmitter in the hearing instrument may be shut down completely, providing a wireless, one-way streaming system for streaming audio from the plurality of microphones disposed in the pair of spectacles to the hearing instruments, thereby saving even more power in the hearing instrument.

One or more embodiments described herein also concerns a pair of spectacles configured for use with one or two hearing instruments. According to the some embodiments, the pair of spectacles comprises a first wireless spectacle transceiver, a battery, a processor and a first plurality of microphones, said plurality of microphones forming a first directional microphone array configured for generating a first electrical signal from acoustic signals picked up by the first plurality of microphones, the first wireless spectacle transceiver being configured to transmit said first electrical signal wirelessly. The wireless signal from the pair of spectacles thus provides a directional microphone signal suitable for wireless reception and reproduction by a hearing instrument.

In an embodiment, the pair of spectacles also comprises a second wireless spectacle transceiver and a second plurality of microphones, said plurality of microphones forming a second directional microphone array configured for generating a second electrical signal from acoustic signals picked up by the second plurality of microphones, the second wireless spectacle transceiver being configured to transmit the second electrical signal wirelessly. By providing the pair of spectacles with a second wireless spectacle transceiver configured in a similar way as the first wireless spectacle transceiver, binaural, directional microphone signals may be conveyed to the hearing instrument user from e.g. the proximal side bar and the distal side bar of the pair of spectacles simultaneously, thereby providing a spectacle hearing device system having superior acoustic directivity.

According to an embodiment, the first and the second wireless spectacle transceivers of the pair of spectacles are adapted to exchange information wirelessly between a proximal hearing instrument and a distal hearing instrument via a wireless link between the first wireless spectacle transceiver and the second wireless spectacle transceiver Hereby an effective means for wireless communication between the two hearing instruments is provided.

In another embodiment, the first and the second wireless spectacle transceivers of the pair of spectacles are adapted to exchange information between the proximal hearing instrument and the distal hearing instrument via an electrical connection between the first wireless spectacle transceiver and the second wireless spectacle transceiver. This arrangement may be utilized in order to save transmission power in both the spectacle transceivers and the hearing instrument transceivers while transmitting information between hearing instruments, since any of the wireless spectacle transmitters only has to be capable of transmitting its wireless signals a few centimeters, e.g. between the proximal spectacle side bar and the proximal hearing instrument, or between the distal spectacle side bar and the distal hearing instrument.

One or more embodiments described herein also concerns a wireless device for use with a spectacle hearing instrument system, said device comprising a wireless spectacle transceiver, a processor, means for fixing the device securely to a pair of spectacles, and a plurality of microphones, said plurality of microphones forming a directional microphone array configured for generating an electrical signal from acoustic signals picked up by the plurality of microphones, the wireless spectacle transceiver being configured to transmit said electrical signal wirelessly. Such a device may be suitable for use with an existing pair of spectacles having a relatively thin frame, where the device may be fitted securely e.g. to one of the side bars or the upper bridge of the pair of spectacles. When fitted, the device may provide a hearing instrument user with a wireless audio stream representing a directional microphone signal picked up by the plurality of the microphones of the device.

One or more embodiments described herein also concerns a method of operating a spectacle hearing device system, said method involving the steps of providing a first hearing instrument having a first, wireless hearing instrument transceiver, a first hearing instrument processor and a first acoustic output transducer, a pair of spectacles comprising a first wireless spectacle transceiver, a spectacle processor and a first plurality of microphones, pairing the first wireless hearing instrument transceiver to the first wireless spectacle transceiver, picking up sound signals using said first plurality of microphones, converting the sound signals into a first electrical signal suitable for wireless transmission, transmitting said electrical signal wirelessly from the first wireless spectacle transceiver to the first wireless hearing instrument transceiver, receiving said electrical signal wirelessly by the first wireless hearing instrument transceiver, applying a first hearing-loss correction to the received, electrical signal according to a first hearing loss correction prescription, and reproducing the received, hearing-loss corrected signal as a first sound signal using the first acoustic output transducer of the first hearing instrument. This method enables directional sound signals picked up by the plurality of microphones of the pair of spectacles to be transmitted wirelessly to a proximal hearing instrument, thus providing a hearing instrument user with improved directional information of the sound environment he or she is experiencing.

According to one embodiment, the method of operating a spectacle hearing device system further involves the steps of providing a second hearing instrument having a second, wireless hearing instrument transceiver, a second hearing instrument processor and a second acoustic output transducer, the pair of spectacles comprising a second wireless spectacle transceiver and a second plurality of microphones, pairing the second wireless hearing instrument transceiver to the second wireless spectacle transceiver, picking up sound signals using said second plurality of microphones, converting the sound signals into a second electrical signal suitable for wireless transmission, transmitting said electrical signal wirelessly from the second wireless spectacle transceiver to the second wireless hearing instrument transceiver, receiving said electrical signal wirelessly by the second wireless hearing instrument transceiver, applying a second hearing-loss correction to the received, electrical signal according to a second hearing loss correction prescription, and reproducing the received, hearing-loss corrected signal as a second sound signal using the second acoustic output transducer of the second hearing instrument. This method provides a user of two hearing instruments with even better directional information, as it allows wireless conveying of directional information of the sound environment binaurally to the hearing instrument user, thus making it easier for the hearing instrument user to locate the origin of sounds in his or her environment.

One or more embodiments described herein also concerns a method of transmitting data regarding operational characteristics from e.g. a proximal hearing instrument wirelessly to a distal hearing instrument using a pair of spectacles, said method involving the steps of providing data regarding operational characteristics of a first processor of a proximal hearing instrument, transmitting said data wirelessly from a first wireless hearing instrument transceiver disposed in the proximal hearing instrument to a first wireless spectacle transceiver disposed in a proximal side bar of the pair of spectacles, receiving said data by the first wireless spectacle transceiver, conveying said data from the first wireless spectacle transceiver to a second wireless spectacle transceiver disposed in the distal side bar of the pair of spectacles, receiving said data in the second wireless spectacle transceiver, retransmitting said data wirelessly from the second wireless spectacle transceiver to a second hearing instrument transceiver disposed in the distal hearing instrument, receiving said data by the second hearing instrument transceiver, and making said received data available to the second processor of the distal hearing instrument. This method offers an effective way of providing wireless communication between two hearing instruments, since the wireless signals from a proximal hearing instrument, which needs to circumnavigate the head of the hearing instrument user in order to be picked up and decoded by a distal hearing instrument may be provided by the wireless transceivers in the pair of spectacles, thus relieving the battery of the proximal hearing instrument of the burden of providing power to the wireless transceiver of the proximal hearing instrument. Since the wireless transmissions from the proximal hearing instrument only have to travel a few centimeters, i.e. from the proximal hearing instrument present in the proximal ear canal to the wireless transceiver in the proximal spectacle side bar resting on the proximal pinna during use, the power requirements of the transceiver of the proximal hearing instrument are greatly reduced.

In one embodiment, the step of transmitting said data from the first spectacle transceiver to the second spectacle transceiver involves retransmitting said data wirelessly from the first wireless spectacle transceiver to the second wireless spectacle transceiver. Since more power may be provided to the wireless spectacle transceivers by having larger and more powerful batteries in the pair of spectacles than is available to the hearing instruments, an increased transmission range may be obtained when using the wireless spectacle transceivers for relaying wireless information from one hearing instrument to the other.

In an alternative embodiment, the step of transmitting said data from the first spectacle transceiver to the second spectacle transceiver involves conveying said data via an electrical connection between the first wireless spectacle transceiver and the second wireless spectacle transceiver. This allows for a neat and effective way of conveying data from one hearing instrument to the other while the pair of spectacles are being worn by the hearing instrument user.

Further features and advantages of the embodiments are disclosed by the dependent claims.

A spectacle hearing device system includes: a first hearing instrument, the first hearing instrument having a first wireless hearing instrument transceiver and a first acoustic output transducer; a pair of spectacles, the pair of spectacles comprising a first wireless spectacle transceiver, and a first plurality of microphones, the first plurality of microphones forming a first directional microphone array configured for generating a first electrical signal from acoustic signals picked up by the first plurality of microphones; a first processor for processing the first electrical signal according to a hearing loss compensation prescription; and a first amplifier for applying the first electrical signal to the first acoustic output transducer; wherein the first wireless spectacle transceiver is configured for transmitting the first electrical signal wirelessly to the first hearing instrument.

Optionally, the system further includes: a second hearing instrument having a second wireless hearing instrument transceiver and a second acoustic output transducer; the pair of spectacles comprising a second wireless spectacle transceiver, and a second plurality of microphones, the second plurality of microphones forming a second directional microphone array configured for generating a second electrical signal from acoustic signals picked up by the second plurality of microphones; the system having a second processor for processing the second electrical signal according to another hearing loss compensation prescription, and a second amplifier for applying the second electrical signal to the second acoustic output transducer, wherein the second wireless spectacle transceiver is configured for transmitting the second electrical signal wirelessly to the second hearing instrument.

Optionally, the first wireless spectacle transceiver is disposed in a proximal side bar of the pair of spectacles, the second wireless spectacle transceiver is disposed in a distal side bar of the pair of spectacles, the first hearing instrument is a proximal hearing instrument, and the second hearing instrument is a distal hearing instrument.

Optionally, each of the first and the second wireless hearing instrument transceivers comprises a wireless signal detector for detecting a wireless signal, a wireless power estimator for estimating a power of the detected wireless signal, and a wireless power controller for reducing a transmission power of the corresponding wireless hearing instrument transceiver when the power of the detected wireless signal is estimated to be exceeding a predetermined limit.

A pair of spectacles for use with one or more hearing instruments, the pair of spectacles includes: a first wireless spectacle transceiver; a processor; and a first plurality of microphones, the first plurality of microphones forming a first directional microphone array configured for generating a first electrical signal from acoustic signals picked up by the first plurality of microphones; wherein the first wireless spectacle transceiver is configured to transmit the first electrical signal wirelessly to a first hearing instrument.

Optionally, the pair of spectacles further includes: a second wireless spectacle transceiver; and a second plurality of microphones, the second plurality of microphones forming a second directional microphone array configured for generating a second electrical signal from acoustic signals picked up by the second plurality of microphones; wherein the second wireless spectacle transceiver is configured to transmit the second electrical signal wirelessly to a second hearing instrument.

Optionally, the first and the second wireless spectacle transceivers are configured to exchange information wirelessly between a proximal hearing instrument and a distal hearing instrument via a wireless link between the first wireless spectacle transceiver and the second wireless spectacle transceiver, the proximal hearing instrument being one of the first and second hearing instruments, and the distal hearing instrument being the other one of the first and second hearing instruments.

Optionally, the first and the second wireless spectacle transceivers are configured to exchange information between the proximal hearing instrument and the distal hearing instrument via an electrical connection between the first wireless spectacle transceiver and the second wireless spectacle transceiver, the proximal hearing instrument being one of the first and second hearing instruments, and the distal hearing instrument being the other one of the first and second hearing instruments.

A device for use with a spectacle hearing instrument system, includes: a wireless spectacle transceiver; a processor; a component for fixing the device securely to a pair of spectacles; and a plurality of microphones, the plurality of microphones forming a directional microphone array configured for generating an electrical signal from acoustic signals picked up by the plurality of microphones; the wireless spectacle transceiver being configured to transmit the electrical signal wirelessly.

A method of operating a spectacle hearing device system, includes: providing a first hearing instrument having a first wireless hearing instrument transceiver, a first hearing instrument processor, and a first acoustic output transducer; providing a pair of spectacles comprising a first wireless spectacle transceiver, a spectacle processor, and a first plurality of microphones; pairing the first wireless hearing instrument transceiver to the first wireless spectacle transceiver; picking up sound signals using the first plurality of microphones; converting the sound signals into a first electrical signal suitable for wireless transmission; transmitting the electrical signal wirelessly from the first wireless spectacle transceiver to the first wireless hearing instrument transceiver; receiving the electrical signal wirelessly by the first wireless hearing instrument transceiver; applying a first hearing-loss correction to the received electrical signal according to a first hearing loss correction prescription; and providing a first sound signal using the first acoustic output transducer of the first hearing instrument.

Optionally, the method further includes: providing a second hearing instrument having a second wireless hearing instrument transceiver, a second hearing instrument processor, and a second acoustic output transducer, wherein the pair of spectacles comprises a second wireless spectacle transceiver, and a second plurality of microphones; pairing the second wireless hearing instrument transceiver to the second wireless spectacle transceiver; picking up sound signals using the second plurality of microphones; converting the sound signals into a second electrical signal suitable for wireless transmission; transmitting the electrical signal wirelessly from the second wireless spectacle transceiver to the second wireless hearing instrument transceiver; receiving the electrical signal wirelessly by the second wireless hearing instrument transceiver; applying a second hearing-loss correction to the received electrical signal according to a second hearing loss correction prescription; and providing a second sound signal using the second acoustic output transducer of the second hearing instrument.

Optionally, the method further includes: detecting a presence of a wireless signal; determining a signal level of the wireless signal; comparing the determined signal level against a first predetermined level limit; reducing a transmission power of one of the respective first and second wireless hearing instrument transceivers if the determined signal level is above the first predetermined level limit; and increasing the transmission power of one of the respective first and second wireless hearing instrument transceivers if the determined signal level is below the first, predetermined level limit.

Optionally, the method further includes: comparing the determined signal level against a second predetermined level limit; and making one of the respective first and second wireless hearing instrument transceivers enter an idle state if the determined signal level is below the second predetermined level limit.

A method of transmitting data regarding operational characteristics of a proximal hearing instrument wirelessly to a distal hearing instrument using a pair of spectacles, includes: providing data regarding operational characteristics of a first processor of a proximal hearing instrument; transmitting the data wirelessly from a first wireless hearing instrument transceiver disposed in the proximal hearing instrument to a first wireless spectacle transceiver disposed in a proximal side bar of the pair of spectacles; receiving the data by the first wireless spectacle transceiver; transmitting the data from the first wireless spectacle transceiver to a second wireless spectacle transceiver disposed in a distal side bar of the pair of spectacles; receiving the data in the second wireless spectacle transceiver; retransmitting the data wirelessly from the second wireless spectacle transceiver to a second hearing instrument transceiver disposed in the distal hearing instrument; and receiving the data by the second hearing instrument transceiver.

Optionally, the act of transmitting the data from the first spectacle transceiver to the second spectacle transceiver involves retransmitting the data wirelessly from the first wireless spectacle transceiver to the second wireless spectacle transceiver.

Optionally, the act of transmitting the data from the first spectacle transceiver to the second spectacle transceiver involves retransmitting the data via an electrical connection between the first wireless spectacle transceiver and the second wireless spectacle transceiver.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only exemplary embodiments and are not therefore to be considered limiting in the scope of the claims.

DETAILED DESCRIPTION

Various embodiments are described hereinafter with reference to the figures. It should be noted that the figures are not necessarily drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 1:
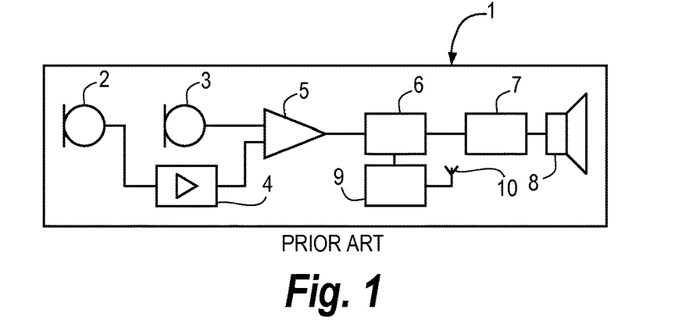
FIG. 1 is a block schematic showing a hearing instrument according to the prior art.

FIG. 1 is a block schematic showing a prior art hearing instrument 1 comprising a first microphone 2, a second microphone 3, a delay unit 4, an A/D converter 5, a digital signal processor 6, a D/A converter 7, an acoustic output transducer 8, a wireless transceiver 9 and an antenna 10. When in use, the first microphone 2 and the second microphone 3 of the hearing instrument 1 picks up sound from the environment and converts the sound into corresponding electrical input signals, favoring sounds from one direction thanks to the delay unit 4. The electrical input signals are then converted into digital signals in the A/D converter 5 and subjected to further processing in the DSP 6. This processing may comprise e.g. amplification, filtering and compression, and is performed according to a hearing compensation prescription provided by a hearing instrument fitting professional in order to compensate for a hearing loss. The hearing-loss compensated, digital signal is then fed to the D/A converter 7 for conversion into an electrical output signal suitable for driving the acoustic output transducer 8, reproducing the processed sounds to the benefit of a user of the hearing instrument 1.

The wireless transceiver 9 provides the DSP 6 of the hearing instrument 1 with wireless signals received by the antenna 10. Wireless signals intended for the hearing instrument 1 may e.g. be remote control signals, audio streams, prescription fitting telegrams etc., and wireless signals transmitted from the hearing instrument 1 may e.g. be service readouts, signal processing coordination data to another hearing instrument, synchronization impulses or the like. A preferred configuration of a wireless transceiver 9 used in conjunction with the prior art hearing instrument 1 utilizes a digital transmission scheme in the 2.4 GHz frequency band, thus providing an external transmitter (not shown) operating at a sensible transmission power level with an effective transmission range of about 8-10 m to the hearing instrument 1.

Figure 2:
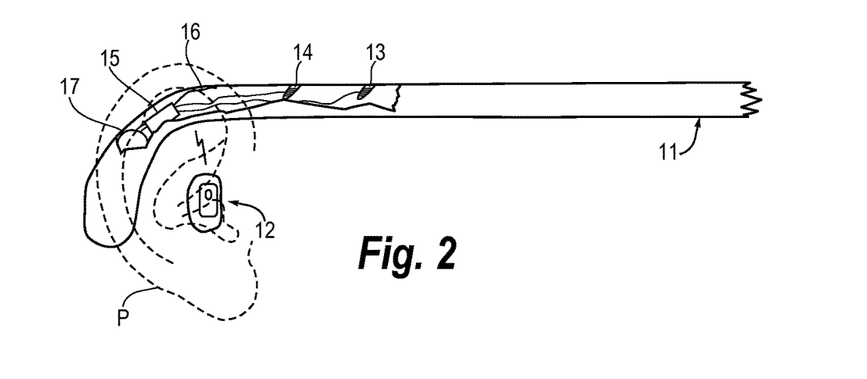
FIG. 2 shows a spectacle hearing device system.

FIG. 2 is a schematic drawing of a proximal, e.g. right side bar 11 of a pair of spectacles with parts cut out in order to disclose a front microphone 13, a rear microphone 14, electronic transceiver and signal processor circuitry 15, an antenna 16 and a battery 17. Also suggested in dotted lines in FIG. 2 is the right pinna P of a hearing instrument user on which the right spectacle side bar 11 is supposed to be resting during use, and a proximal, right ITE hearing instrument 12 configured for being situated in the right ear canal of the hearing instrument user. In the following discussion, a similar arrangement of a left spectacle side bar and a left ITE hearing instrument is assumed to be disposed on the left side of the head of the hearing instrument user, i.e. distal.

During use, the front microphone 13 and the rear microphone 14 in the spectacle side bar 11 picks up acoustic signals from the environment and converts them into electrical signals, which are fed to the electronic transceiver and signal processor circuitry 15, where the electrical signals are converted into a digital signal suitable for wireless transmission to the ITE hearing instrument 12 via the antenna 16. The electronic transceiver and signal processor circuitry 15 of the spectacle side bar 11 continually streams the acoustic signals wirelessly to the hearing instrument 12. The hearing instrument 12 receives the digital signal and reproduces the acoustic signals picked up by the front microphone 13 and the rear microphone 14 in the spectacle side bar 11.

The configuration of the ITE hearing instrument 12 may, in some embodiments, be substantially as the prior art hearing instrument 1 shown in FIG. 1, i.e. no additional technical features need to be added to the hearing instrument 12 in FIG. 2 in order to make it work with the pair of spectacles. Prior to a first use, the electronic transceiver and signal processor circuitry 15 of the spectacle side bar 11 has to be within communication range of the wireless transceivers and paired mutually in order to exclude wireless signals from other wireless devices which incidentally happen to be within range of the hearing instruments during use. The pairing of the hearing instrument 12 to the corresponding transceiver and signal processing circuitry 15 of the spectacle side bar 11 may be performed as a simple exchange of wireless identification telegrams, enabling recognition of the paired device whenever it is turned on and within range. The pairing operation could e.g. be performed by a professional audiologist at the time of fitting the hearing instruments, but may just as easily be performed by the hearing instrument user at home after purchase, since the pairing procedure is quite uncomplicated.

Due to the larger space available in the back end of the spectacle side bar 11 when compared with the ITE hearing instrument 12, the spectacle side bar 11 is capable of holding a much larger battery 17 than the ITE hearing instrument 12 may comfortably accommodate, thus being capable of providing the transceiver and signal processing circuitry 15 in the spectacle side bar 11 with more power than would be possible if a battery of a type similar to the battery (not shown) powering the ITE hearing instrument 12 were used. This provides the spectacle hearing device system with at least two distinct advantages; Firstly, the pair of spectacles of the spectacle hearing device system may act as a transmission relay for conveying wireless transmissions between the two hearing instruments, thus relieving the wireless transceivers of the hearing instruments themselves of the rather heavy power requirements associated with direct wireless communication between two hearing instruments. Secondly, the transmission power of the hearing instruments in general may be greatly reduced, since the required effective transmission distance of the hearing instrument transceiver is reduced from 8-10 m to a couple of cm, i.e. from the ITE hearing instrument 12 to the spectacle side bar 11 located atop the pinna P of the hearing instrument user. This may e.g. be realized by increasing the idle period between the hearing instrument transmissions or by shortening the duration of the telegrams transmitted from the hearing instruments, thus reducing power by reducing the duty cycle of the transmitter of the transceiver of the hearing instrument.

In one embodiment, the wireless spectacle transceiver circuitry 15 of the proximal spectacle side bar is connected electrically with the corresponding wireless spectacle transceiver circuitry (not shown) of the distal spectacle side bar, e.g. via the nose bridge (not shown) of the pair of spectacles. This arrangement may save power in the wireless spectacle transceivers, since power to transmit from e.g. the wireless spectacle transceiver in the proximal side bar of the pair of spectacles to the wireless spectacle transceiver in the distal side bar of the pair of spectacles is not required.

Whenever the pair of spectacles is removed from the head of the user and folded together, the transceiver and signal processing circuitry 15 in the spectacle side bar 11 is preferably powered off automatically, and the wireless transmission link between the wireless electronic circuitry 15 of the spectacle side bar 11 and the ITE hearing instrument 12 is broken. The ITE hearing instrument 12 then no longer receives a wireless audio stream but instead reproduces the sounds picked up by its internal microphones. During setup of the wireless connection between the electronic circuitry 15 in the spectacle side bars 11 and the hearing instruments 12, a hearing instrument fitter may provide the user with a customized hearing instrument fitting where the signals from the internal microphones of the ITE hearing instrument 12 are blended to a predetermined degree with the wirelessly received signals originating from the front and rear microphones 13, 14 present in the spectacle side bar 11 in order to provide an acoustic output signal from the ITE hearing instrument 12 to the hearing instrument user. This results in a more seamless disconnection of the signals from the pair of spectacles whenever the pair of spectacles are put away.

During fitting of the hearing instrument 12, the hearing instrument fitter may provide the hearing instrument user with a selection of different hearing programs intended for a variety of different listening situations the hearing instrument user may experience during use. The fitting may include the step of pairing the hearing instrument 12 with the transceiver and signal processing circuitry 15 of the spectacle side bar 11 of a pair of spectacles, which may be fitted together with the hearing instrument 12. A remote control (not shown) associated with the ITE hearing instrument 12 may then be configured to control the transceiver and signal processing circuitry 15 in the spectacle side bar 11, e.g. to provide one or more programs in the hearing instrument 12 associated with the wireless signals from the transceiver and signal processing circuitry 15, said programs being activated by the hearing instrument user by selecting the appropriate hearing instrument program with the remote control, thereby providing the hearing instrument user with one or more programs involving the beam-formed signals from the microphones 13, 14.

In some circumstances, the wireless transceiver (not shown in FIG. 2) of the hearing instrument 12 may have difficulty receiving wireless signals from e.g. a device transmitting an audio signal wirelessly from a television set intended for wireless reception by the hearing instrument 12. This may, for instance, be the case if the antenna (not shown) of the hearing instrument 12 has to be made very small due to space constraints in the hearing instrument itself. Thanks to the retransmission capabilities of the transceiver and signal processing circuitry 15 of the spectacle side bar 11, and the fact that the antenna 16 may have better wireless reception capabilities than the antenna of the hearing instrument 12, the hearing instrument fitter now has the choice of providing the hearing instrument user with a program enabling the transceiver and signal processing circuitry 15 of the spectacle side bar 11 is configured to receive the wirelessly transmitted audio signal from the television set and retransmit it to the hearing instrument 12.

The spectacle side bar 11 may comprise a power switch (not shown) for powering off the transceiver and signal processing circuitry 15 whenever the pair of spectacles are not used with the hearing instrument 12 in order to save the power provided by the battery 17. The power switch (not shown) may be conveniently placed on e.g. the side bar 11, or it may be activated by folding the pair of spectacles together when the pair of spectacles are put away between uses.

In the embodiment shown in FIG. 2, only two microphones 13, 14 are shown in the spectacle side bar 11. It may, however, be advantageous to have three or more microphones in each of the spectacle side bars in order to provide a better directivity signal to the hearing instrument user. In an embodiment (not shown), the microphones may instead be built into the spectacle frame, preferably pointing forward when the pair of spectacles is worn by a user. The positioning of the microphones may also be selected to match the chosen configuration of the spectacle frame itself.

Figure 3:
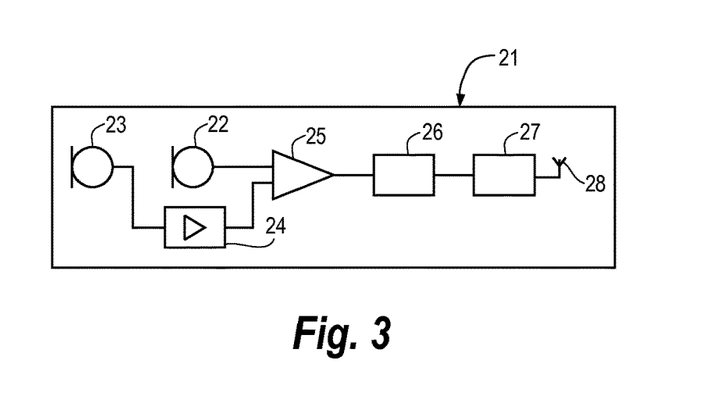
FIG. 3 is a block schematic showing a wireless spectacle transceiver and microphone array intended for a spectacle side bar.

FIG. 3 shows a block schematic of the circuitry 21 forming part of a spectacle hearing device system intended to be built into a side bar of a pair of spectacles according to an embodiment. The circuitry 21 comprises a front microphone 22, a rear microphone 23, a delay unit 24, a microphone amplifier 25, an A/D converter 26, a transceiver 27 and an antenna 28. Acoustic signals are picked up by the front microphone 22 and the rear microphone 23, respectively, converting the acoustic signals into electrical signals in the process. In the embodiment shown in FIG. 3, directional information is obtained from the electrical signals by virtue of the delay unit 24, but the skilled person will appreciate that directional information may be derived from signals from the microphones 22 and 23 using any other suitable beam-forming means known in the art. The electrical signals are amplified by the amplifier 25 and converted into digital signals in the A/D converter 26. The digital signals output from the A/D converter 26 is fed to an input of the transceiver 27, converted into a wireless signal and transmitted wirelessly via the antenna 28.

When in use, the circuitry 21 serves as a wireless, directional hearing instrument microphone system configured to be disposed within a side bar of a pair of spectacles. Once paired to a hearing instrument 12 as described in conjunction with FIG. 2, the circuitry 21 may be in an idle state until a wireless signal from a paired hearing instrument is detected by the transceiver 27, thus saving battery power whenever the pair of spectacles are put away, e.g. in a spectacle pouch. When in the idle state, the circuitry 21 may be configured to draw no or very little power, allowing storage of the pair of spectacles for days or even weeks without significant drainage of battery power. The batteries (not shown) intended for powering the circuitry 21 may be of the same type as the battery types typically used in high-power BTE hearing instruments. This has the advantage of simplifying logistics to the fitter and the hearing instrument retailer since a customer may obtain batteries for use with the spectacle hearing instrument system while purchasing batteries for the hearing instruments. When the pair of spectacles are worn by a hearing instrument user, the transceiver 27 detects an interrogation signal transmitted by a paired hearing instrument 12 (see FIG. 2) and thus enters an active state, in essence transmitting sounds picked up by the front microphone 22 and the rear microphone 23 wirelessly to a hearing instrument 12 as a digital audio stream.

When paired to the circuitry 21 in the pair of spectacles, the hearing instrument 12 is capable of receiving the wireless, digital audio stream from the transceiver 28 of the circuitry 21, decode the received digital audio stream, apply correctional signal processing to the decoded digital audio stream according to a hearing loss compensation prescription, and reproduce the hearing-loss-corrected digital audio stream as an acoustic signal to a hearing instrument user. The digital audio stream originating from the front and rear microphones 22, 23, respectively, in the circuitry 21 comprises directional information about the sound environment, in essence making this directional information available to a hearing instrument otherwise lacking the capability of obtaining this directional information from the internal microphones of the hearing instrument.

In an embodiment (not shown), the hearing instrument 12 may lack the presence of any internal microphones completely, the hearing instrument circuitry only comprising a wireless transceiver, a signal processor and an acoustic output transducer. This embodiment frees up space in the hearing instrument for e.g. a larger battery having a prolonged service life.

In an embodiment, the wireless hearing instrument transceiver comprises means for detecting the power of received, wireless signals and means for reducing the power of the transmitter of its own transceiver to e.g. 10% of the nominal power of the transmitter whenever the power of the received, wireless signal exceeds a predetermined limit, thus prolonging the expected battery life. One suggested way power consumption may be reduced, is by shortening the length of the telegrams transmitted from the hearing instrument or by increasing the idle pauses between successive transmissions from the hearing instrument, although other power reduction strategies may be employed according to the limitations and possibilities offered by the chosen transceiver technology and transmission protocol.

This embodiment exploits that the received power of a wireless transmitter is inversely proportional to the distance squared, i.e.

$$P_{rx} \propto \frac{P_{tx}}{D^2},$$

where $P_{rx}$ is the power received, $P_{tx}$ is the power transmitted, and D is the distance. The net result of this arrangement is that the hearing instrument may be adapted to save power whenever the hearing instrument user wears a pair of spectacles. This is due to the fact that the transmission power detected by the hearing instruments will exceed the predetermined limit when the pair of spectacles are worn by the hearing instrument user because of the shorter wireless transmission distance, and the spectacle transceivers therefore are close to the corresponding hearing instruments. Whenever the pair of spectacles are removed, the wireless hearing instrument receiver will detect a drop in transmission power and may even begin to lose transmission packages from the wireless digital data stream received from the spectacle transceivers. The hearing instrument may then shut down its own wireless transceiver entirely and preferably re-enable the signals from its internal microphones, if present, if these signals have been suppressed while using the wireless transceiver.

Figure 4:
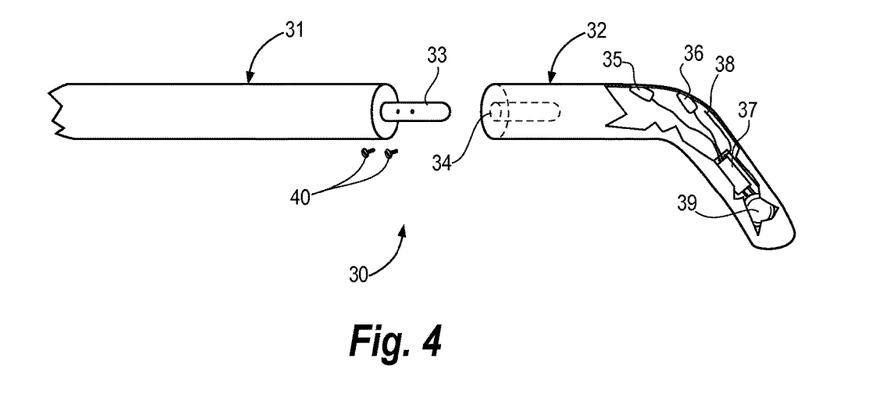
FIG. 4 shows a spectacle part adapted for attachment on a side bar of an existing pair of spectacles.

FIG. 4 is a partly exploded view of a spectacle part 32 adapted for attachment on a side bar 31 of an existing pair of spectacles by embedding a pin 33 of the side bar 31 of the pair of spectacles in a corresponding recess 34 in the spectacle part 32 and securing the spectacle part 32 to the spectacle side bar 31 by suitable screws 40. In FIG. 4, the spectacle part 32 is shown with part of its outer shell removed in order to expose a front microphone 35, a rear microphone 36, an electronic circuitry 37, an antenna 38 and a battery 39. The electronic circuitry 37 is capable of processing signals from the microphones 35, 36, and transmitting the processed microphone signals wirelessly to e.g. a hearing instrument (not shown) via the antenna 38. During use, the battery 39 provides power to the electronic circuitry 37 of the spectacle part 32. The spectacle part 32 is adapted for being interchanged with a corresponding original spectacle part (not shown) originally mounted on the side bar 31 of the existing pair of spectacles.

Prior to mounting the spectacle part 32, the original spectacle part (not shown) is removed by loosening the securing screws 40 and pulling the original spectacle part off the pin 33 of the spectacle side bar 31. The recess 34 embodied in the front part of the spectacle part 32 is configured to receive the pin 33 of the spectacle side bar 31 when the spectacle part 32 is fitted to the spectacle side bar 31. After fitting the spectacle part 32 on the spectacle side bar 31, the securing screws 40 are tightened, keeping the spectacle part 32 securely fixed to the side bar 31 of the pair of spectacles, ready for use with a hearing instrument (not shown in FIG. 4).

Figure 5:
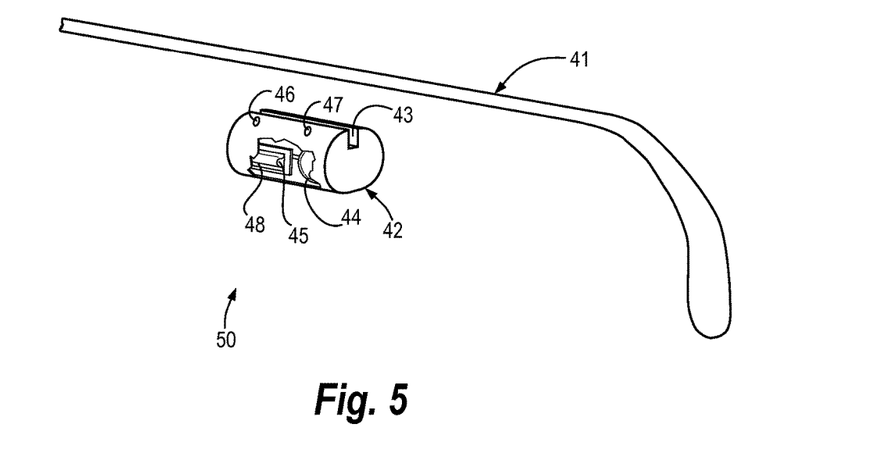
FIG. 5 shows a wireless device for mounting on a side bar of an existing pair of spectacles.

FIG. 5 shows part of a spectacle hearing instrument system 50 according to an embodiment comprising a wireless spectacle transceiver device 42 adapted for mounting on a spectacle side bar 41 of an existing pair of spectacles. The wireless spectacle transceiver device 42 comprises a substantially elongated groove 43, a front microphone 46, and a rear microphone 47. In FIG. 5, part of the housing of the wireless spectacle transceiver device 42 is cut away in order to expose a battery 44, an electronic circuitry 45 and an antenna 48 disposed within the housing of the wireless spectacle transceiver device 42. The substantially elongated groove 43 is configured to receive the side bar 41 of a pair of spectacles as suggested in FIG. 5. The wireless spectacle transceiver device 42 is preferably made from a substantially resilient material such as a suitable plastic or elastomeric material suitably formed in order for the longitudinal groove 43 to grip and encase part of the spectacle side bar 41. When mounted on the spectacle side bar 41, the wireless spectacle transceiver device 42 may be further secured by any suitable fastening means such as screws, clamps, or the like.

During use, the wireless spectacle transceiver device 42 is mounted onto the spectacle side bar 41 as suggested in the foregoing, being positioned next to the temple of a hearing instrument user. The electronic circuitry 45 processes signals from the environment picked up by the front microphone 46 and the rear microphone 47, and transmits the processed signals wirelessly to a hearing instrument (not shown) intended to be worn simultaneously by a hearing instrument user. In FIG. 5, the wireless spectacle transceiver device 42 is shown in a proximal configuration. A similar wireless spectacle transceiver device (not shown) may be mounted on a distal spectacle side bar (not shown) for use with a distal hearing instrument (not shown), and may essentially be embodied as a mirror image of the proximal wireless spectacle transceiver device 42. The wireless spectacle transceiver device 42 may beneficially be fitted to an existing spectacle side bar 41 without further modifications to the pair of spectacles themselves, especially if the pair of spectacles have a relatively thin frame, and therefore also a relatively thin spectacle side bar 41.

Figure 6:
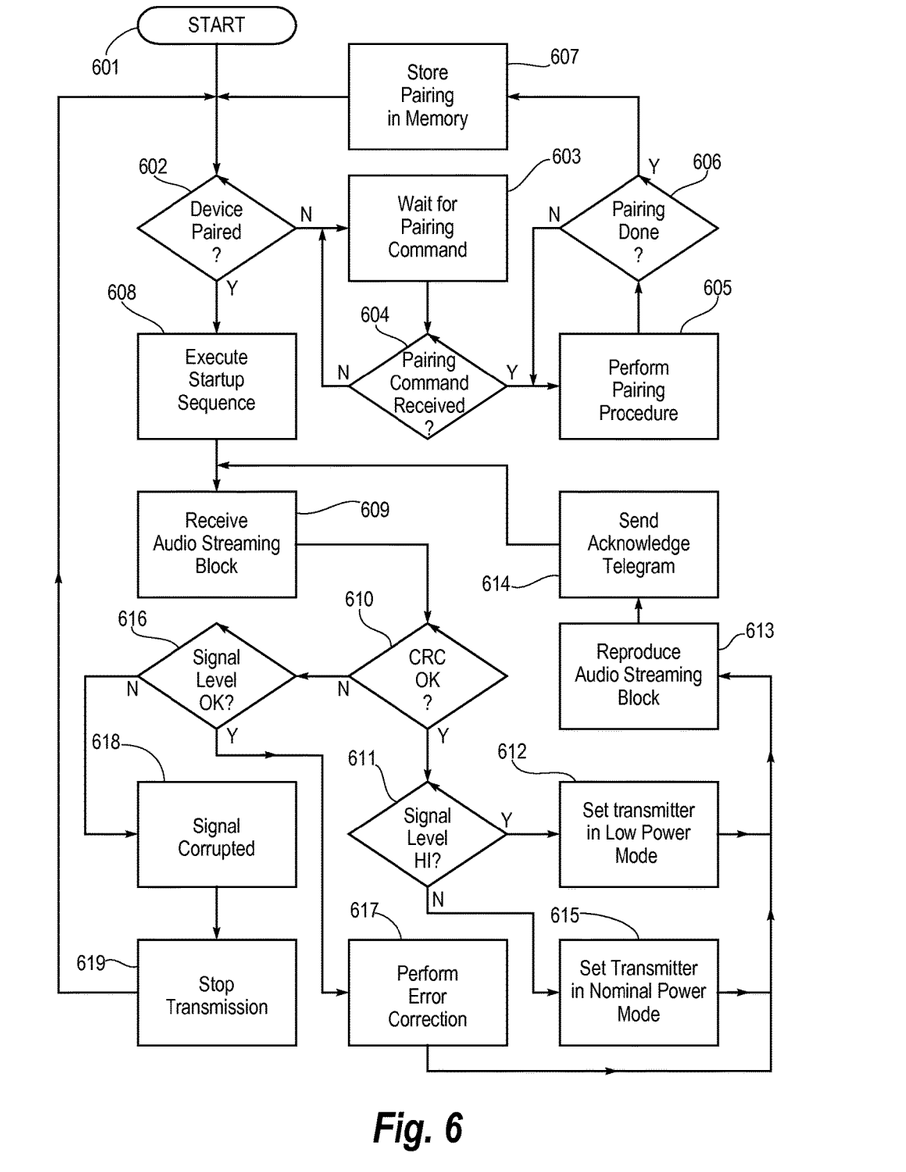
FIG. 6 is a flowchart showing the handling of the wireless functionality of the spectacle hearing device system.

FIG. 6 is a flowchart showing the handling of the wireless functionality of an embodiment of the spectacle hearing device system. The flowchart illustrates the handling routine as seen from the hearing instrument side. It is assumed in the following that a hearing instrument and a wireless spectacle transceiver is present, within range of the wireless signals, and powered on. The purpose of the wireless spectacle transceiver is to stream an audio signal picked up by microphones disposed on or in a side bar of the pair of spectacles wirelessly to a hearing instrument.

When powered on, the hearing instrument firmware performs a boot-up sequence of the hearing instrument and starts up wireless communication by entering step 601 of the handling routine in FIG. 6, wherein a wireless interrogation telegram is transmitted in order to detect if another device is present and within range. When a wireless identification telegram is received from the external device, the handling routine enters step 602 and checks if the device has been paired to the hearing instrument by comparing the identity of the external device against a trusted device identity list in memory. If the external device is not found in the list, then the external device is not paired, and a pairing operation thus have to be performed before any further communication can take place.

The handling routine enters a pairing subroutine in step 603, and waits for a pairing command to be received. The reception of a pairing command is checked in step 604. If a pairing command is not received, the routine returns to step 603 and continues waiting. When a pairing command is received, the routine continues to step 605 where the actual pairing of the external device to the hearing instrument is performed, and to step 606, where the routine checks if the pairing procedure is properly completed. If this is not the case, then the pairing procedure is repeated in step 605. If the pairing is successful, the routine stores an identity number of the paired, external device in memory in step 607 and loops back into step 602 to perform a recheck for a paired, external device.

If the pairing check in step 602 turns out in the affirmative, the routine then performs a startup sequence in step 608, where audio buffers and other communication parameters are set up in order to begin receiving a wireless audio stream from the paired device. The routine then continues in step 609, wherein one wirelessly transmitted audio streaming block is received and decoded by the hearing instrument. During decoding of the received audio streaming data block, a cyclic redundancy check (CRC) is performed and communicated to the handling routine, checking it in step 610. If this check reveals the received data block to be correct, the routine continues to step 611, where a received signal strength indicator (RSSI) of the received wireless signal is examined. If the CRC check reveals a transmission error, the routine branches out from step 610 to step 616, where the wireless signal level is examined more closely. If the signal level is above a predetermined minimum value, error correction of the data block may be possible, and the routine continues to step 617, where error correction is performed on the received data block. When error correction on the data block has finished, the routine continues to step 613 in order to reproduce the error-corrected audio streaming data block.

If, however, the signal level is below the predetermined minimum value when being examined in step 616, the system concludes that the transceiver of the spectacle side bar is beyond the reception range of the hearing instrument, and the routine thus branches out into step 618, where the wireless signal as such is deemed corrupt. From step 618, the routine continues to step 619, where the transmitter of the wireless transceiver of the hearing instrument is shut down, and from step 619 the routine loops back into step 602 in order to reestablish the wireless connection with the paired transceiver of the spectacle side bar.

The handling of the RSSI is described in greater detail in the following. When the RSSI level is examined in step 611, this information is used to determine the mode of operation of the transmitter section of the wireless hearing instrument transceiver. If the RSSI level is above a predetermined value, denoted HI in FIG. 6, the routine branches out into step 612, where the algorithm puts the transmitter section of the wireless hearing instrument transceiver into a low power transmission mode. This in done under the assumption that the high RSSI level originates from a spectacle side bar transceiver being very close to the hearing instrument, i.e. within a few centimeters. This may e.g. be the case when the hearing instrument is in place in the ear canal and the pair of spectacles are resting on the nose and ears of the hearing instrument user, respectively. If the RSSI level is below the predetermined value examined in step 611, the routine instead branches out into step 615 and puts the transmitter section of the wireless hearing instrument transceiver into a nominal power transmission mode. This handling of power modes allows for communication between the hearing instrument and the transceiver in the side bar of the pair of spectacles in an effective way, even if the pair of spectacles are taken off temporarily. The actual handling of the low power mode in step 612 may e.g. be performed by the hearing instrument transceiver by increasing the idle periods between transmissions from the hearing instrument or by reducing the length of the transmissions from the hearing instrument.

Regardless of the operating mode of the transmitter section of the wireless hearing instrument transceiver, the routine continues from step 612 or step 615, respectively, into step 613, where the received audio streaming data block is being reproduced by the hearing instrument by placing the entire audio streaming data block in a reproduction buffer for external signals of the hearing instrument processor. The contents in the reproduction buffer is handled by an external audio reproduction routine (not shown) running concurrently with the wireless transmission handling routine. From step 613, the routine continues to step 614, where an acknowledge receipt for wireless transmission to the wireless transceiver of the spectacle side bar is composed and transmitted by the transmitter section of the wireless hearing instrument transceiver. From step 614, the routine loops back into step 609 to wait for the next audio streaming data buffer to be received wirelessly from the transceiver of the spectacle side bar.

Figure 7:
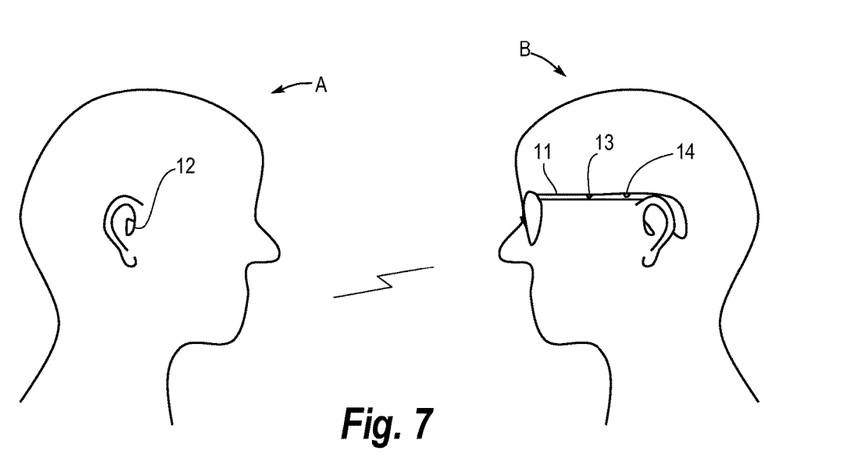
FIG. 7 shows a pair of spectacles used as a wireless remote microphone.

FIG. 7 illustrates the spectacle hearing instrument system configured to be used as a remote microphone system. In FIG. 7, a first person A is wearing an ITE hearing instrument 12, and a second person B is wearing a pair of spectacles. The spectacle side bar 11 comprises the front microphone 13, the rear microphone 14 and a transceiver (not shown) for transmitting sound signals picked up by the microphones 13, 14 wirelessly to the hearing instrument 12 worn by the first person A. Although FIG. 7 shows a proximal hearing instrument 12 and a proximal spectacle side bar 11, a distal hearing instrument (not shown) worn by the first person A and a distal spectacle side bar (not shown) worn by the second person B is implied.

During use, the second person B speaks from some distance to the first person A. The speech may be too faint to be picked up reliably by the microphones (not shown) of the hearing instrument 12, but at the same time clear enough to be picked up by the microphones 13 and 14 disposed in the spectacle side bar 11 worn by the second person B. The transceiver (not shown) in the spectacle side bar 11 transmits the speech picked up by the microphones 13, 14 wirelessly to the hearing instrument 12 worn by the first person A, essentially establishing a wireless remote microphone system for the benefit of the first person A. Since the microphones and the transceiver are built discretely and almost invisibly into the pair of spectacles worn by the second person B, the wireless remote microphone system is less obtrusive than having an external device attached e.g. to the clothing of the second person B while improving conversation between the second person B and the first person A.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A pair of spectacles comprising:
   a first wireless spectacle transceiver;
   a processor; and
   a first plurality of microphones, the first plurality of microphones forming a first directional microphone array configured for generating a first electrical signal from acoustic signals picked up by the first plurality of microphones;
   wherein the first wireless spectacle transceiver is configured to transmit the first electrical signal wirelessly to a first hearing instrument;
   a second wireless spectacle transceiver; and
   a second plurality of microphones, the second plurality of microphones forming a second directional microphone array configured for generating a second electrical signal from acoustic signals picked up by the second plurality of microphones;
   wherein the second wireless spectacle transceiver is configured to transmit the second electrical signal wirelessly to a second hearing instrument;
   wherein the first and the second wireless spectacle transceivers are configured to exchange information between the first and second hearing instruments via an electrical connection between the first wireless spectacle transceiver and the second wireless spectacle transceiver.

2. A spectacle hearing device system comprising the pair of spectacles of claim 1, and
   the first hearing instrument, the first hearing instrument having a first wireless hearing instrument transceiver.

3. The spectacle hearing device system according to claim 2, further comprising the second hearing instrument, the second hearing instrument having a second wireless hearing instrument transceiver.

4. The spectacle hearing device system according to claim 3, wherein each of the first and the second wireless hearing instrument transceivers comprises a wireless signal detector for detecting a wireless signal, a wireless power estimator for estimating a power of the detected wireless signal, and a wireless power controller for reducing a transmission power of the corresponding wireless hearing instrument transceiver when the power of the detected wireless signal is estimated to be exceeding a predetermined limit.

5. The pair of spectacles of claim 1, wherein the first wireless spectacle transceiver is disposed in a first side bar of the pair of spectacles, the second wireless spectacle transceiver is disposed in a second side bar of the pair of spectacles.

6. The pair of spectacles of claim 1, further comprising a temple, and
   a housing for containing the processor;
   wherein the housing comprises a slot for accommodating a portion of the temple.

7. The pair of spectacles of claim 1, further comprising a temple, wherein a portion of the temple is detachably attachable to another portion of the temple.

8. The pair of spectacles of claim 1:
   wherein the information comprises operational information, and wherein the first wireless spectacle transceiver is configured to receive the operational information transmitted from a transceiver at the first hearing instrument.

9. A method performed by a pair of spectacles that is configured to communicate with a first hearing instrument and a second hearing instrument, comprising:
   receiving data by a first wireless spectacle transceiver, wherein the data is regarding operational characteristics of the first hearing instrument, and is transmitted wirelessly from a first hearing instrument transceiver disposed in the first hearing instrument to the first wireless spectacle transceiver disposed in a first side bar of the pair of spectacles;
   transmitting the data from the first wireless spectacle transceiver to a second wireless spectacle transceiver disposed in a second side bar of the pair of spectacles;
   receiving the data in the second wireless spectacle transceiver;
   transmitting the data wirelessly from the second wireless spectacle transceiver to a second hearing instrument transceiver disposed in the second hearing instrument.

10. The method of claim 9, further comprising:
   picking up first sound signals using a first plurality of microphones;
   converting the first sound signals into a first electrical signal; and
   transmitting the first electrical signal wirelessly from the first wireless spectacle transceiver to the first hearing instrument transceiver.

11. The method according to claim 10, further comprising:
   picking up second sound signals using a second plurality of microphones;
   converting the second sound signals into a second electrical signal; and
   transmitting the second electrical signal wirelessly from the second wireless spectacle transceiver to the second hearing instrument transceiver.

12. The method according to claim 9, further comprising:
   determining a signal level;
   comparing the determined signal level against a first predetermined level limit;
   reducing a transmission power of one of the first and second hearing instrument transceivers if the determined signal level is above the first predetermined level limit; and
   increasing the transmission power of one of the first and second hearing instrument transceivers if the determined signal level is below the first, predetermined level limit.

13. The method according to claim 12, further comprising:
   comparing the determined signal level against a second predetermined level limit; and
   making one of the first and second hearing instrument transceivers enter an idle state if the determined signal level is below the second predetermined level limit.

14. The method according to claim 9, wherein the act of transmitting the data from the first spectacle transceiver to the second spectacle transceiver comprises transmitting the data wirelessly from the first wireless spectacle transceiver to the second wireless spectacle transceiver.

15. The method according to claim 9, wherein the act of transmitting the data from the first spectacle transceiver to the second spectacle transceiver comprises transmitting the data via an electrical connection between the first wireless spectacle transceiver and the second wireless spectacle transceiver.

16. The method of claim 9, wherein a portion of the first side bar is detachably attachable to another portion of the first side bar.

\* \* \* \* \*